United States Patent
Anderson et al.

(10) Patent No.: US 10,850,736 B2
(45) Date of Patent: Dec. 1, 2020

(54) TRANSMISSION CONTROL OR STEERING CONTROL BASED ON ONE OR MORE OPERATING INPUTS ASSOCIATED WITH A VEHICLE

(71) Applicant: Caterpillar Inc., Deerfield, IL (US)

(72) Inventors: Randall T. Anderson, Peoria, IL (US); Luke R. Sheley, Peoria, IL (US); Michael A. Berry, Peoria, IL (US); Manuel Gomes, La Terrasse (FR); Guillaume Raffin, St Nizier du Moucherotte (FR)

(73) Assignee: Caterpillar Inc., Peoria, IL (US)

(*) Notice: Subject to any disclaimer, the term of this patent is extended or adjusted under 35 U.S.C. 154(b) by 276 days.

(21) Appl. No.: 15/968,274

(22) Filed: May 1, 2018

(65) Prior Publication Data
US 2019/0337517 A1 Nov. 7, 2019

(51) Int. Cl.
*B60W 30/18* (2012.01)
*B60W 10/11* (2012.01)
*B60W 10/20* (2006.01)

(52) U.S. Cl.
CPC ...... *B60W 30/18145* (2013.01); *B60W 10/11* (2013.01); *B60W 10/20* (2013.01); *B60W 2540/18* (2013.01); *B60W 2556/50* (2020.02); *B60W 2710/1005* (2013.01); *B60W 2710/207* (2013.01)

(58) Field of Classification Search
CPC ....... B60W 30/18; B60W 10/11; B60W 10/20
See application file for complete search history.

(56) References Cited

U.S. PATENT DOCUMENTS

| | | | | |
|---|---|---|---|---|
| 5,948,029 A | * | 9/1999 | Straetker | B62D 11/183 180/6.44 |
| 6,032,751 A | * | 3/2000 | Loichinger | B62D 11/10 180/6.7 |
| 6,059,383 A | * | 5/2000 | Paggi | B60T 8/246 303/155 |
| 6,269,295 B1 | | 7/2001 | Gaugush et al. | |
| 6,527,070 B2 | * | 3/2003 | Ryan | B62D 11/08 180/6.2 |
| 7,318,629 B1 | * | 1/2008 | Sun | B60T 8/1755 303/146 |
| 10,321,622 B2 | * | 6/2019 | Muemken | A01B 69/008 |
| 2001/0030068 A1 | * | 10/2001 | Nagorkca | B62D 55/08 180/6.2 |
| 2005/0206231 A1 | * | 9/2005 | Lu | B60G 17/0162 303/146 |
| 2010/0100293 A1 | * | 4/2010 | Takanami | F16H 61/0213 701/65 |
| 2019/0217884 A1 | * | 7/2019 | Siddiqui | B62D 5/046 |

FOREIGN PATENT DOCUMENTS

| | | |
|---|---|---|
| JP | 2006056334 | 3/2006 |
| JP | 5128455 | 1/2013 |

* cited by examiner

*Primary Examiner* — Kira Nguyen
(74) *Attorney, Agent, or Firm* — Harrity & Harrity LLP (57) ABSTRACT

An example, described herein, involves monitoring an operating input of a vehicle; determining a turning maneuver is to be performed by the vehicle with a decreased turn radius based on the operating input; determining that a transmission of the vehicle is to be downshifted to a low gear to enable the vehicle to perform the turning maneuver; and downshifting the transmission to the low gear.

16 Claims, 4 Drawing Sheets

TRANSMISSION CONTROL OR STEERING CONTROL BASED ON ONE OR MORE OPERATING INPUTS ASSOCIATED WITH A VEHICLE

TECHNICAL FIELD

The present disclosure relates generally to control of a vehicle and, more particularly, to transmission control or steering control based on one or more operating inputs associated with the vehicle.

BACKGROUND

Track type vehicles (e.g., bulldozers, excavators, and/or the like) may have a powershift transmission and a differential steering system both of which are driven by an engine. A tightest turning radius (i.e., a smallest circle) is obtained when the transmission is in the lowest gear providing a slow centerline speed while the steering pump is delivering as much flow as possible. Operators need to downshift the transmission to obtain a tight turning radius and then upshift the transmission when done with steering to obtain a higher travel speed. This requires extra coordinated steps every time the operator desires to perform a turning maneuver with a tight turning radius, and, thus, requires more effort than track type tractors with continuously variable transmissions (CVTs) (hystat, electric only require steering input). This difference is a competitive disadvantage for vehicles with a powershift transmission (with discrete gear ratios). A vehicle may include a vehicle control device to control the powershift transmission (e.g., which gear is engaged to drive the vehicle).

One such vehicle control device is disclosed in Japanese Patent No. JP 5128455B2 ("the '455 patent"). Per the '455 patent, the vehicle control device provides control for a vehicle capable of preventing damage to a steering brake caused by a turning motion during high-speed downhill travel. In a bulldozer of the '455 patent, shift clutch control valves are controlled by a shift control unit by the forward operation or the reverse operation of a steering lever, and the forward traveling or backward traveling of the bulldozer is performed. The '455 patent discloses that when an automatic shift mode is selected by a shift mode changeover switch, a lockup clutch control valve and a shift clutch control valve by a shift control unit and the shift control valve are controlled, switching between a torque converter mode and a lockup mode and switching a speed stage in a transmission are automatically performed according to an automatic shift map.

While the automatic shift of the transmission of the '455 patent is described, the automatic shift does not only occur when such a feature is enabled. For example, the '455 patent does not describe an ability to disable the feature. Additionally, the '455 patent does not describe shifting the transmission to a lowest gear and adjusting a hydraulic pump to enable a hydraulic motor to provide increased flow. Furthermore, the '455 patent does not utilize an engine deceleration input to trigger auto-shifting to avoid unintended downshifts when a tighter turn radius may not be desired. The '455 patent does not describe automatically upshifting a transmission after completion of a turning maneuver.

The vehicle controller of the present disclosure solves one or more of the problems set forth above and/or other problems in the art.

SUMMARY

According to some implementations, a vehicle controller may include one or more processors to: monitor an operating input of a vehicle; determine a turning maneuver is to be performed by the vehicle with a decreased turn radius based on the operating input; determine that a transmission of the vehicle is to be downshifted to a low gear to enable the vehicle to perform the turning maneuver; and downshift the transmission to the low gear.

According to some implementations, a system of a vehicle may include a steering input mechanism; a powershift transmission with at least two discrete gear ratios; a hydraulic motor; and a vehicle controller to: receive an operating input of the vehicle from the steering input mechanism; determine a turning maneuver is to be performed by the vehicle with decreased turn radius based on the operating input; determine that the powershift transmission of the vehicle is to be downshifted to a lower gear to enable the vehicle to perform the turning maneuver; and automatically downshift the transmission to the lower gear.

According to some implementations, a method may include monitoring, by a vehicle controller, a steering input of a vehicle; monitoring, by the vehicle controller, an engine deceleration input of the vehicle; determining, by the vehicle controller, a turning maneuver with a decreased turn radius is to be performed by the vehicle based on the steering input and the engine deceleration input; determining, by the vehicle controller, that a transmission of the vehicle is to be downshifted to a lower gear to enable the vehicle to perform the turning maneuver; and downshifting, by the vehicle controller, the transmission to the lower gear.

DETAILED DESCRIPTION

This disclosure relates to a vehicle control and/or a vehicle controller for a vehicle. The vehicle controller has universal applicability to any vehicle utilizing such a vehicle controller. The term "vehicle" may refer to any machine that performs an operation associated with an industry such as, for example, mining, construction, farming, transportation, or any other industry. As some examples, the vehicle may include a heavy machine, such as a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other paving or underground mining equipment. Moreover, one or more implements may be connected to the vehicle and driven and/or controlled by the vehicle controller.

Figure 1:
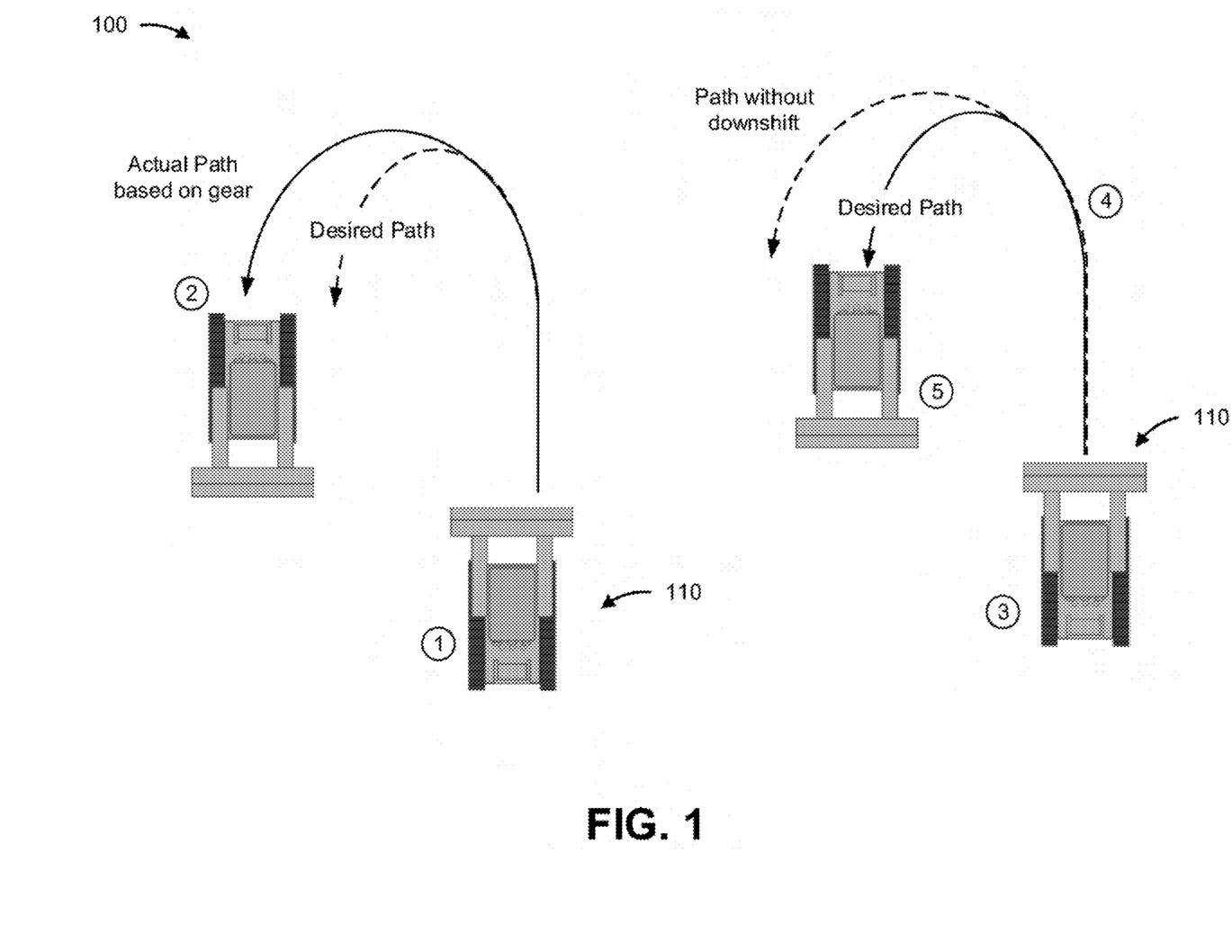
FIG. 1 is a diagram of an overview of an example implementation described herein.

FIG. 1 is a diagram of an overview of an example implementation 100 described herein. As shown in example implementation 100, a vehicle 110 is controlled to follow a desired path by automatically controlling an engaged transmission and/or hydraulic motor of vehicle 110, as described herein. In some implementations, such automatic controlling may be enabled and/or disabled based on a user input.

As shown in FIG. 1, and by phase 1, vehicle 110 is to follow a desired path to perform a turning maneuver. In phase 1 of example implementation 100, vehicle 110 may be operating in second gear, which is the second lowest gear of a transmission of vehicle 110. In some implementations, a vehicle controller of vehicle 110 may determine the turning maneuver and/or desired path based on one or more operating inputs (e.g., a steering input, an engine decelerator input, a navigation input, and/or the like) from vehicle 110. As shown by phase 2, due to the speed of vehicle 110 in second gear, vehicle 110 (e.g., via a vehicle controller) determines that vehicle 110 would not follow the desired path of the turning maneuver. For example, vehicle 110 may not be able to move slowly enough, while in second gear, to complete the relatively tight turning maneuver that is indicated by the one or more operating inputs of vehicle 110. Accordingly, vehicle 110 may automatically adjust a transmission output speed (TOS) to slow vehicle 110 (e.g., by downshifting the transmission to a lower gear).

As further shown in FIG. 1, and by phase 3 of example implementation 100, vehicle 110 determines the transmission is to be downshifted to first gear (which is a lowest gear) to permit vehicle 110 to follow the desired path. For example, vehicle 110 may determine, from the one or more operating inputs, that the transmission is to be downshifted to a lower gear, thus slowing the TOS. In some implementations, based on an operator adjusting a steering input, based on the operator interacting with (e.g., compressing) an engine decelerator, and/or based on a path of interest of a navigation system, vehicle 110 may automatically determine when the transmission is to be downshifted to enable vehicle 110 to follow the desired path. As shown by phase 4 in FIG. 1, vehicle 110 adjusts a hydraulic motor to account for the speed change of vehicle 110 due to the down shift. For example, due to the difference in transmission output speed between the gears (e.g., from second gear to first gear) vehicle 110 may slow down, which would decrease the turning radius of vehicle 110 due to vehicle 110 being controlled by a hydraulic motor that depends on the speed of the TOS. Therefore, vehicle 110 (e.g., via the vehicle controller) may control the hydraulic motor to decrease a hydraulic flow to adjust the steering output of the differential mechanism to prevent oversteering of vehicle 110 (e.g., where vehicle 110 would turn too tight of a turning radius).

As shown phase 5 in FIG. 1, vehicle 110 follows the desired path. In some implementations, after the turning maneuver of example implementation 100 is complete, vehicle 110 may automatically upshift the transmission of vehicle 110 (e.g., to return the vehicle to a previous speed and/or transmission setting of the vehicle prior to the turning maneuver). For example, based on one or more operating inputs indicating that the turning maneuver is complete (e.g., the steering input indicating a straight line path, a decelerator input not being activated, and/or a navigation input showing a path of interest being a straight line), vehicle 110 (e.g., via the vehicle controller) may upshift the transmission from first gear back to second gear. As such, vehicle 110 may automatically shift gears for the turning maneuver, such that the operator of vehicle 110 does not need to manually shift gears of the transmission of vehicle 110 during the turning maneuver.

As indicated above, FIG. 1 is provided merely as an example. Other examples are possible and may differ from what was described with regard to FIG. 1.

Figure 2:
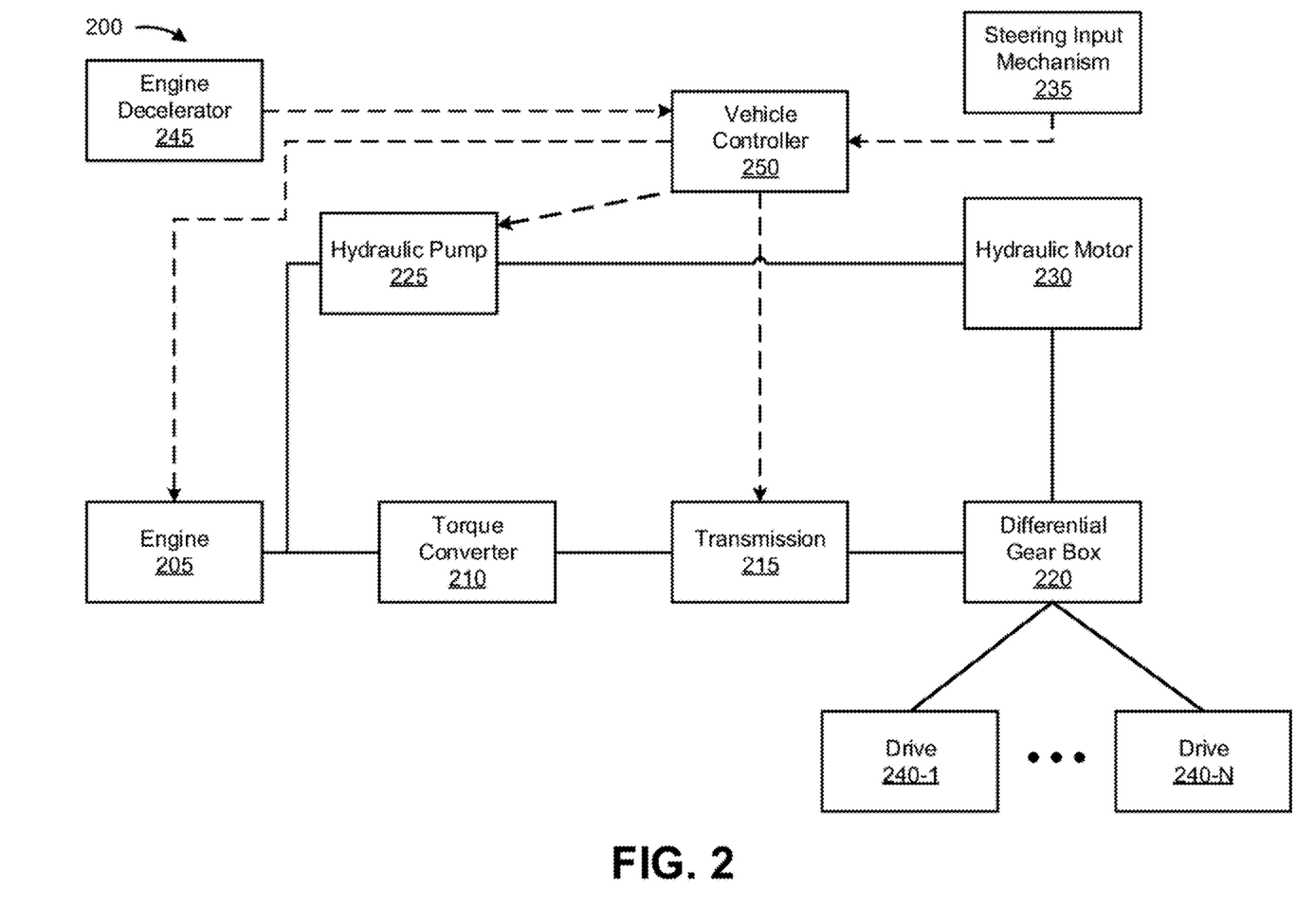
FIG. 2 is a diagram of an example configuration of a system in which systems and/or methods, described herein, may be implemented.

FIG. 2 is a diagram of an example system 200 in which systems and/or methods, described herein, may be implemented. As shown in FIG. 2, system 200 may include an engine 205, a torque converter 210, a transmission 215, a differential gear box 220, a hydraulic pump 225, a hydraulic motor 230, a steering input mechanism 235, one or more drives 240-1 through 240-N (where N is an integer and is greater than 1) (hereinafter referred to collectively as "drives 240," and individually as "drive 240"), an engine decelerator 245, and a vehicle controller 250. Components of system 200 may interconnect via electrical connections (e.g., wired and/or wireless connections), mechanical connections, or a combination of electrical and mechanical connections. As described herein, system 200 may be a system of, or associated with, a vehicle (e.g., vehicle 110).

Engine 205 includes any power source capable of providing power (e.g., mechanical and/or electrical power) to one or more elements of system 200. For example, engine 205 may include an internal combustion engine (ICE), such as a gasoline powered engine, a diesel engine, and/or the like. Additionally, or alternatively, engine 205 may include an electrically powered engine. As shown in system 200, engine 205 may provide power to torque converter 210 and/or hydraulic pump 225. Accordingly, engine 205 may be a power source of the vehicle.

Torque converter 210 includes a fluid coupling capable of transferring rotational power from a power source to a load. For example, torque converter 210 may include one or more mechanical components to transfer power from engine 205 to transmission 215. Accordingly, torque converter 210 can provide mechanical power transfer for the vehicle.

Transmission 215 includes one or more mechanical elements (e.g., gears) configured to adjust a rotational power output from torque converter 210. Transmission 215 may be a powershift transmission with discrete gear ratios (e.g., at least two gear ratios). In some implementations, transmission 215 may include an automatic transmission that can be controlled by a controller (e.g., a vehicle controller) based on one or more characteristics of transmission 215 and/or the vehicle (e.g., speed, load, torque output, and/or the like).

Differential gear box 220 includes one or more mechanical elements (e.g., gears) configured to provide power to drives 240 and steer a vehicle associated with system 200 based on the power applied to the drives 240. For example, differential gear box 220 may provide steering by inversely driving a first drive 240-1 and a second drive 240-2. For example, if hydraulic motor 230 (e.g., based on a steering input) is to cause the vehicle to turn in a first direction (e.g., left), the gear box may increase the power applied to first drive 240-1 and decrease the power applied to second drive 240-2. In some implementations, differential gear box 220 may be configured to provide power to steer the vehicle, in the first direction, equally to each of first drive 240-1 and second drive 240-2, but in opposite directions. Accordingly, differential gear box 220 mechanically transfers an appropriate amount of power to drives 240 to move and steer the vehicle.

Hydraulic pump 225 is any suitable pump to circulate hydraulic fluid through a hydraulic circuit of a vehicle associated with system 200. Hydraulic pump 225 may hydraulically enable steering of the vehicle through pumping hydraulic fluid to provide a hydraulic flow to hydraulic motor 230. Hydraulic pump 225 may receive power (e.g., mechanical power and/or electrical power) from engine 205 to produce the hydraulic flow. In some implementations, hydraulic pump 225 is a variable displacement pump that can enable a variable amount of flow based on a mechanical feature of the pump (e.g., a swashplate that controls the flow based on an angle of the swashplate). In some implementations, the flow of fluid produced by hydraulic pump 225 is dependent upon an engine speed of engine 205. For example, the faster the mechanical output from engine 205, the faster the hydraulic flow produced by hydraulic pump 225.

Hydraulic motor 230 includes one or more mechanical elements to provide a mechanical steering input to differential gear box 220. In some implementations, differential gear box 220 may be configured to adjust the speeds of two or more drives 240 to steer the vehicle. Hydraulic motor 230 may increase or decrease the speed input to differential gear box 220 based on the amount of hydraulic flow provided by hydraulic pump 225. When a steering input is received from steering input mechanism 235, vehicle controller 250 may instruct hydraulic pump to increase and/or decrease a hydraulic flow, causing hydraulic motor 230 to adjust a direction of rotational speed and/or an amount of rotational speed provided to differential gear box 220.

Steering input mechanism 235 includes one or more devices capable of providing steering inputs to vehicle controller 250. In some implementations, steering input mechanism 235 may include one or more mechanical user interfaces (e.g., a steering wheel, a steering lever, a steering shaft, and/or the like) or electrical user interfaces (e.g., a keypad, a touchscreen, a joystick, and/or the like). In some implementations, steering input mechanism 235 may include one or more navigation devices (e.g., a global positioning system (GPS), a triangulation system, and/or the like) that provides steering instructions based on navigational instructions. Steering input mechanism 235 provides steering inputs to vehicle controller 250 to cause differential gear box 220 to control speeds of drives 240 to steer the vehicle. For example, based on the steering input from steering input mechanism 235, vehicle controller 250 may instruct hydraulic pump 225 to increase or decrease hydraulic flow, causing hydraulic motor 230 to control gear box 220 to control speeds of drives 240.

Drives 240 includes one or more elements to drive the vehicle. For example, drives 240 may be one or more axels connected to one or more tracks, wheels, and/or the like. Drives 240 may be configured with differential gear box 220 to provide differential steering of the vehicle.

Engine decelerator 245 includes one or more mechanical or electrical devices to enable an operator to decelerate an engine speed of engine 205. For example, engine decelerator 245 may include a user interface (e.g., a mechanical or electrical user interface) to enable an operator to indicate a reduced desired engine speed to vehicle controller. As a more specific example, the operator may push a pedal that indicates the reduced desired engine speed and causes vehicle controller to decrease the engine speed of the engine 205 (e.g., via reducing an amount of fuel to the engine, via an engine brake, and/or the like). In some instances, the greater the engine decelerator 245 is applied, the slower the desired engine speed of engine 205 indicated by vehicle controller 250 to engine 205. In some implementations, engine decelerator 245 may be monitored as an input to determine a desired path for the vehicle and/or determine whether transmission 215 is to be upshifted or downshifted. For example, when engine decelerator 245 is activated (e.g., by an operator pressing a pedal associated with engine decelerator 245), vehicle controller 250 may determine that the vehicle is to make a relatively tight turn, or at least a tighter turn than is possible while transmission 215 is in the current gear. As such, vehicle controller 250 may determine (e.g., from a threshold associated with the user input of engine decelerator 245) whether to downshift transmission 215 to complete a turning maneuver and/or follow a desired path of the vehicle.

Vehicle controller 250 may include one or more apparatuses for controlling one or more components of system 200. Vehicle controller 250 is implemented in hardware, firmware, or a combination of hardware and software. Vehicle controller 250 is implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, vehicle controller 250 includes one or more processors capable of being programmed to perform a function. In some implementations, one or more memories, including a random access memory (RAM), a read only memory (ROM), and/or another type of dynamic or static storage device (e.g., a flash memory, a magnetic memory, and/or an optical memory) may store information and/or instructions for use by vehicle controller 250.

Vehicle controller 250 may receive one or more inputs from one or more components of system 200 and/or from one or more sensors associated with the components of system 200 and provide an output to control system 200 based on the one or more inputs. For example, vehicle controller 250 may receive an input signal from engine decelerator 245 and/or steering input mechanism 235 to generate an output signal to shift gears of transmission 215 (e.g., from a relatively low gear to a relatively high gear or from a relatively high gear to a relatively low gear) and/or control hydraulic flow (e.g., increase or decrease the hydraulic flow) provided by hydraulic pump 225. Accordingly, vehicle controller 250 may be used to shift transmission gears and/or adjust hydraulic flow of hydraulic fluid for hydraulic motor 230 to ensure the vehicle follows a desired path associated with a turning maneuver and/or returns to a particular speed or gear after completion of the turning maneuver.

The number and arrangement of components shown in FIG. 2 are provided as an example. In practice, there may be additional components, fewer components, components, or differently arranged components than those shown in FIG. 2. Furthermore, two or more components shown in FIG. 2 may be implemented within a single component, or a single component shown in FIG. 2 may be implemented as multiple, separate, and/or distributed components. Additionally, or alternatively, a set of components (e.g., one or more components) of system 200 may perform one or more functions described as being performed by another set of components of system 200.

Figure 3:
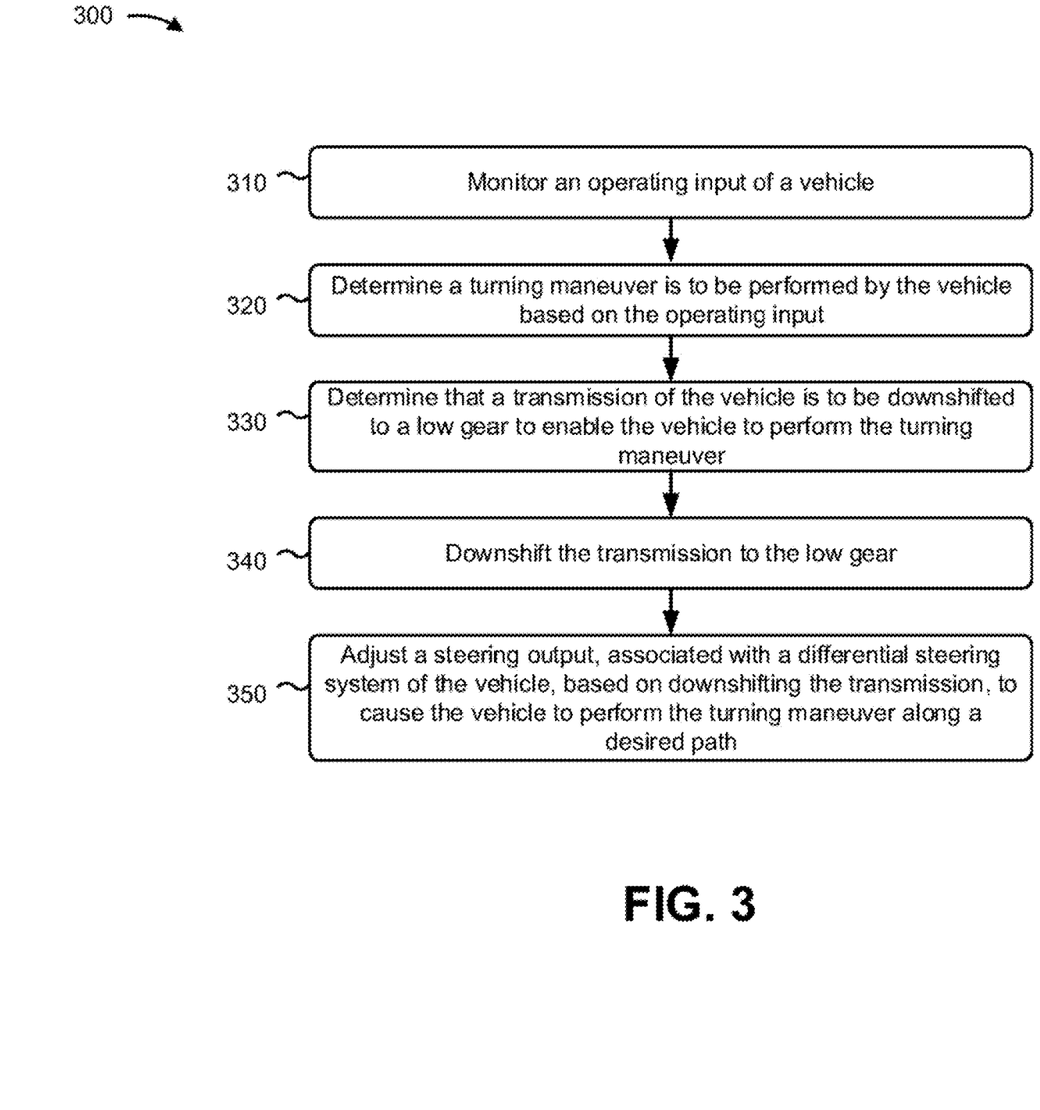
FIG. 3 is a flow chart of an example process associated with transmission control or steering control based on one or more operating inputs associated with a vehicle.

FIG. 3 is a flow chart of an example process 300 associated transmission control or steering control based on one or more operating inputs associated with a vehicle. In some implementations, one or more process blocks of FIG. 3 may be performed by vehicle controller 250. In some implementations, one or more process blocks of FIG. 3 may be performed by another component or a group of components separate from or including vehicle controller 250, such as steering input mechanism 235, engine decelerator 245, and/or the like.

As shown in FIG. 3, process 300 may include monitoring an operating input of a vehicle (block 310). For example, vehicle controller 250 may monitor one or more operating inputs from steering input mechanism 235 and/or engine decelerator 245. In some implementations, vehicle controller 250 may monitor the operating input, based on being powered on, based on being activated to monitor the operating input, and/or the like.

An operating input may be one or more inputs used by vehicle controller 250 to control a transmission and/or steering associated with a vehicle. For example, an operating input may include one or more steering inputs from steering input mechanism 235 (e.g., from a mechanical steering input device, from an electronic steering input device, from a navigational device, and/or the like). Additionally, or alternatively, an operating input may include one or more engine deceleration inputs received by engine decelerator 245. According to some implementations, the operating inputs may be indicative of or provide information associated with determining a desired path or intended path of travel for a vehicle. For example, an amount that a steering lever (associated with steering input mechanism 235) is adjusted or that a decelerator pedal (associated with engine decelerator 245 is pressed) may indicate that an operator is intending to make a corresponding turn of a particular degree or that has a particular turning radius.

According to some implementations described herein, vehicle controller 250, by monitoring the operating inputs, may track changes to settings and/or configurations associated with the operating inputs. For example, when one or more of the operating inputs changes by a particular threshold, vehicle controller 250 may be activated to determine whether one or more components of the vehicle are to be correspondingly controlled. In some implementations, vehicle controller 250 may obtain and/or receive the operating inputs from appropriate components of the vehicle (e.g., from steering input mechanism 235 and/or engine decelerator 245). In some implementations, vehicle controller 250 monitors the operating inputs based on being configured to monitor one or more steering inputs associated with steering input mechanism 235 to provide controlled steering of the vehicle to follow a desired path. For example, vehicle controller 250 may be activated to provide automatic steering control and/or downshifting (e.g., via a user interface of the vehicle). Accordingly, an operator may enable and/or disable automatic steering and/or downshifting, as described herein.

In this way, vehicle controller 250 may monitor the operating input associated with a vehicle to permit vehicle controller 250 to determine a turning maneuver to be performed by the vehicle.

As further shown in FIG. 3, process 300 may include determining a turning maneuver is to be performed by the vehicle based on the operating input (block 320). For example, vehicle controller 250 may determine that the turning maneuver is to be performed by the vehicle. In some implementations, vehicle controller 250 may determine the turning maneuver based on monitoring the operating input of the vehicle and/or being activated to determine the turning maneuver.

As used herein, a turning maneuver involves a vehicle altering or changing course. For example, when a vehicle is traveling in a relatively straight line, when an operating input indicates that the vehicle is to change course (e.g., based on a degree of interaction or change in the operating input), vehicle controller 250 may determine that a turning maneuver is to be performed. The turning maneuver may involve the vehicle altering a previous course to travel in a new desired path that corresponds to the operating input. For example, vehicle controller 250 may determine that a turning maneuver is to be performed based on a degree of interaction with steering input mechanism 235 and/or engine decelerator 245. For example, if a steering lever of the steering input mechanism 235 is moved 10% (one way or the other) and/or a decelerator input of the engine decelerator 245 is compressed at least 10%, vehicle controller 250 may determine that a turning maneuver is to be performed (e.g., in the direction indicated by the steering lever).

According to some implementations, vehicle controller 250 may determine that the turning maneuver is to be performed based on the operating input satisfying a threshold. For example, if a steering input (e.g., a steering lever) is adjusted in a particular direction (e.g., by a user) to a threshold percentage (e.g., 20%), vehicle controller 250 may determine that the turning maneuver is to be performed. Furthermore, an engine deceleration input associated with engine decelerator 245, when operated to a threshold percentage (e.g., 10%), may indicate that the turning maneuver is to be performed. Additionally, or alternatively, navigation input or navigation information, associated with a navigation system, may indicate that a turning maneuver is to be performed. For example, the navigation information may indicate a turning maneuver is to be performed based on a path of interest of the navigation system including a turn of a threshold angle (e.g., at least 45 degrees). In such cases, vehicle controller 250 may determine the turning maneuver is to be performed based on the navigation input.

In this way, vehicle controller 250 may determine a turning maneuver is to be performed by a vehicle to permit vehicle controller 250 to determine a desired path associated with the turning maneuver.

As further shown in FIG. 3, process 300 may include determining that a transmission of the vehicle is to be downshifted to a low gear to enable the vehicle to perform the turning maneuver (block 330). For example, vehicle controller 250 may determine that the transmission is to be downshifted. In some implementations, vehicle controller 250 may determine the transmission is to be downshifted based on determining the desired path.

In some implementations, vehicle controller 250 determines that the transmission is to be downshifted based on values of one or more operating inputs and/or a currently engaged gear of transmission 215. For example, when in a particular gear (e.g., second gear), a steering lever (associated with steering input mechanism 235) moved 50% (e.g., by the operator) in a direction indicating a left turn may indicate that the vehicle is to make a 90 degree left turn. Based on the degree of the turn, the value of the steering input (50%), and/or the rate associated with moving the steering input, vehicle controller 250 may determine that the transmission is to be downshifted (e.g., because the values of the thresholds satisfy a downshift threshold associated with being in second gear). In some cases, a decelerator input can be used to determine the turning maneuver in combination with the steering lever. For example, if the decelerator input is pressed to a particular threshold (e.g., at least 20%), vehicle controller 250 may determine that the turning maneuver is supposed to be approximately 90 degrees (or greater) but with a tighter turning radius. Furthermore, the value associated with the decelerator input may indicate that the transmission is to be automatically downshifted to enable the vehicle to perform the desired turning maneuver.

In some implementations, vehicle controller 250 may implement a scoring system that takes into account values associated with received and/or monitored operating inputs. In such cases, vehicle controller 250 may apply various weights to various operating inputs (e.g., based on operator preferences, based on a configuration, based on machine characteristics, based on particular values of the operating inputs, and/or the like). Accordingly, one operating input (e.g., steering input) may be more heavily weighted than another (e.g., decelerator input) when determining whether to downshift transmission 215. Accordingly, based on the values associated with the operating inputs, vehicle controller 250 may determine that transmission 215 is to be downshifted to enable the vehicle to perform the turning maneuver.

In some implementations, vehicle controller 250 may determine the transmission is to be downshifted based on determining the turning capabilities of the vehicle in a currently engaged gear relative to the turning maneuver and/or desired path. The engaged gear of transmission 215 is the gear that is engaged to provide output power from transmission 215 to differential gear box 220, which ultimately drives the vehicle via drives 240. Vehicle controller 250 may determine the engaged gear based on a sensor associated with transmission 215, based on an operator setting or input associated with transmission 215 (e.g., an operator may use a user interface to set which gear of transmission 215 is to be engaged to provide power to drives 240). Further, vehicle controller 250 may determine a potential turning radius (e.g., relative to a steering input from steering input mechanism 235) of the vehicle when in the engaged gear and compare that turning radius to a calculated turning radius of the desired path.

In this way, vehicle controller 250 may determine that transmission 215 is to be downshifted to enable the vehicle to perform the turning maneuver.

As further shown in FIG. 3, process 300 may include downshifting the transmission to the lower gear (block 340). For example, vehicle controller 250 may downshift transmission 215. In some implementations, vehicle controller 250 may downshift transmission 215 based on determining that transmission 215 is to be downshifted corresponding to operating inputs of the vehicle, based on a setting associated with the vehicle, and/or the like.

According to some implementations, vehicle controller 250 automatically downshifts the transmission to the low gear without receiving manual instructions to perform the downshift (e.g., from the operator). When vehicle controller 250 downshifts the transmission, vehicle controller 250 lowers the gear ratio in transmission 215 using a gear controller associated with transmission 215 and/or torque converter 210.

In some implementations, vehicle controller 250 may downshift the transmission based on an input and/or configuration of the vehicle. Additionally, or alternatively, an automatic shift input may be received via a user interface of the vehicle (e.g., from an operator of the vehicle). In such cases, the vehicle controller 250 may downshift the transmission only if the automatic shift input is enabled (e.g., switched to active state). As such, an operator may control whether vehicle controller 250 is to automatically downshift transmission 215.

In this way, vehicle controller 250 may downshift transmission 215 to permit the vehicle to perform the turning maneuver and enable vehicle controller 250 to adjust a steering output to cause the vehicle to perform the turning maneuver along a desired path.

As further shown in FIG. 3, process 300 may include adjusting a steering output, associated with a hydraulic motor of the vehicle, based on downshifting the transmission, to cause the vehicle to perform the turning maneuver along a desired path (block 350). For example, vehicle controller 250 may adjust a hydraulic flow from hydraulic pump 225 and/or a steering output from hydraulic motor 230. In some implementations, vehicle controller 250 may adjust the steering output based on downshifting the transmission, based on the operating input, based the turning maneuver, based on determining a desired path of the vehicle to perform the turning maneuver, and/or the like.

As used herein, a desired path may be a path that is to be followed by a vehicle according to one or more operating inputs (e.g., a steering input, an engine deceleration input, a navigation input, and/or the like). Accordingly, the desired path may be based on one or more configurations and/or thresholds established for downshifting transmission 215 and/or controlling a steering output from hydraulic motor 230.

In some implementations, a desired path for a vehicle is calculated or determined based on operating inputs. For example, a relatively high degree (e.g., over 80%) of a steering input may indicate a desired path with a tighter turning radius than a desired path with a relatively low degree (e.g., less than 50%). Additionally, or alternatively, a relatively high engine deceleration input indicates a relatively tighter turning radius of a desired path associated with a turning maneuver than a relatively low engine deceleration input. In some implementations, a navigation system may provide a desired path. Accordingly, vehicle controller 250 may determine the desired path for a turning maneuver from a navigation input received from the navigation system.

According to some implementations, as described herein, when the transmission of the vehicle is downshifted, the vehicle is able to turn with a tighter turning radius because the speed of the vehicle and the speed of drives 240 moving the vehicle are reduced. As such, as soon as vehicle controller 250 automatically downshifts the transmission to a lower gear, the vehicle, due to the mechanical properties of the vehicle, will begin to turn in a tighter radius (or more sharply) than before the downshift. However, in such instances, an operator may not be prepared for such a sharp turn and/or this may cause the vehicle to veer from a desired path of the turning maneuver. Accordingly, to prevent the vehicle from veering off the desired path associated with the turning maneuver and/or prevent an accident, in some implementation, when a steering input does not indicate a turning maneuver corresponding to a relatively sharp turn (e.g., when the steering input is 25-50% in a particular direction), vehicle controller 250 may downshift the transmission but adjust a steering output of hydraulic motor 230 to prevent the vehicle from over steering. In some implementations, vehicle controller 250 may adjust the steering output from hydraulic motor 230 by decreasing hydraulic flow from hydraulic pump 225. Decreasing the hydraulic flow to hydraulic pump 225 will prevent hydraulic motor 230 from causing drives 240 to turn the vehicle too sharply.

In some implementations, vehicle controller 250 may adjust one or more thresholds (e.g., downshift thresholds) associated with downshifting transmission 215. For example, vehicle controller 250 may utilize an offset, a scaling factor, and/or the like to cause the TOS to satisfy the threshold for downshifting transmission 215 in order to increase a likelihood that transmission 215 is downshifted. Such a downshift may then slow the vehicle while maintaining an engine speed of engine 205. In such cases, vehicle controller 250 may make the adjustments when the steering input and decelerator input satisfies a particular threshold. In some implementations, vehicle controller 250 may include and/or maintain one or more data structures (e.g., tables, indexes, and/or the like) that map the adjustments (e.g., offsets, scaling factors and/or the like) to the thresholds (and vice versa).

In some implementations, vehicle controller 250 may adjust one or more thresholds associated with adjusting the steering. For example, vehicle controller 250 may adjust a steering output (e.g., using an offset, a scaling factor, and/or the like) from hydraulic motor 230. Such adjustments may be calculated using any suitable scoring system, thresholds, and/or the like. For example, a scaling factor may correspond to one or more benchmarks that vehicle controller 250 may use to determine a degree of any steering adjustments that are to be made. Such scaling factors may be included within a data structure used and/or maintained by the vehicle controller 250. As such, when determining whether to adjust a steering output of the vehicle, vehicle controller 250 may refer to one or more data structures that provide thresholds that may be combined, compared, and/or the like to determine whether to adjust a steering output from hydraulic motor 230. For example, when vehicle controller 250 downshifts transmission 215 during a turning maneuver that does not involve a relatively sharp turn as indicated by the one or more data structures (e.g., steering input was indicated as 25-50%), vehicle controller 250 may decrease the hydraulic flow from hydraulic pump 225 to lessen the degree of steering output from hydraulic motor 230. As such, the vehicle, following the downshift, will not oversteer (or turn too tightly) and veer off a desired path associated with the turning maneuver.

In this way, vehicle controller 250 may adjust a steering output to cause the vehicle to perform the turning maneuver along a desired path.

In some implementations, vehicle controller 250 may automatically upshift transmission 215 after completion of a turning maneuver. For example, vehicle controller 250 may monitor operating inputs during the turning maneuver, and when the operating inputs indicate that the turning maneuver is complete (e.g., steering inputs return to 0% (straight), the decelerator input is not activated, a path of interest of a navigation input is relatively straight, and/or the like), vehicle controller 250 may upshift the transmission back to the same gear (or a higher gear) that was engaged before the turning maneuver was initiated (e.g., back to second gear from first gear).

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
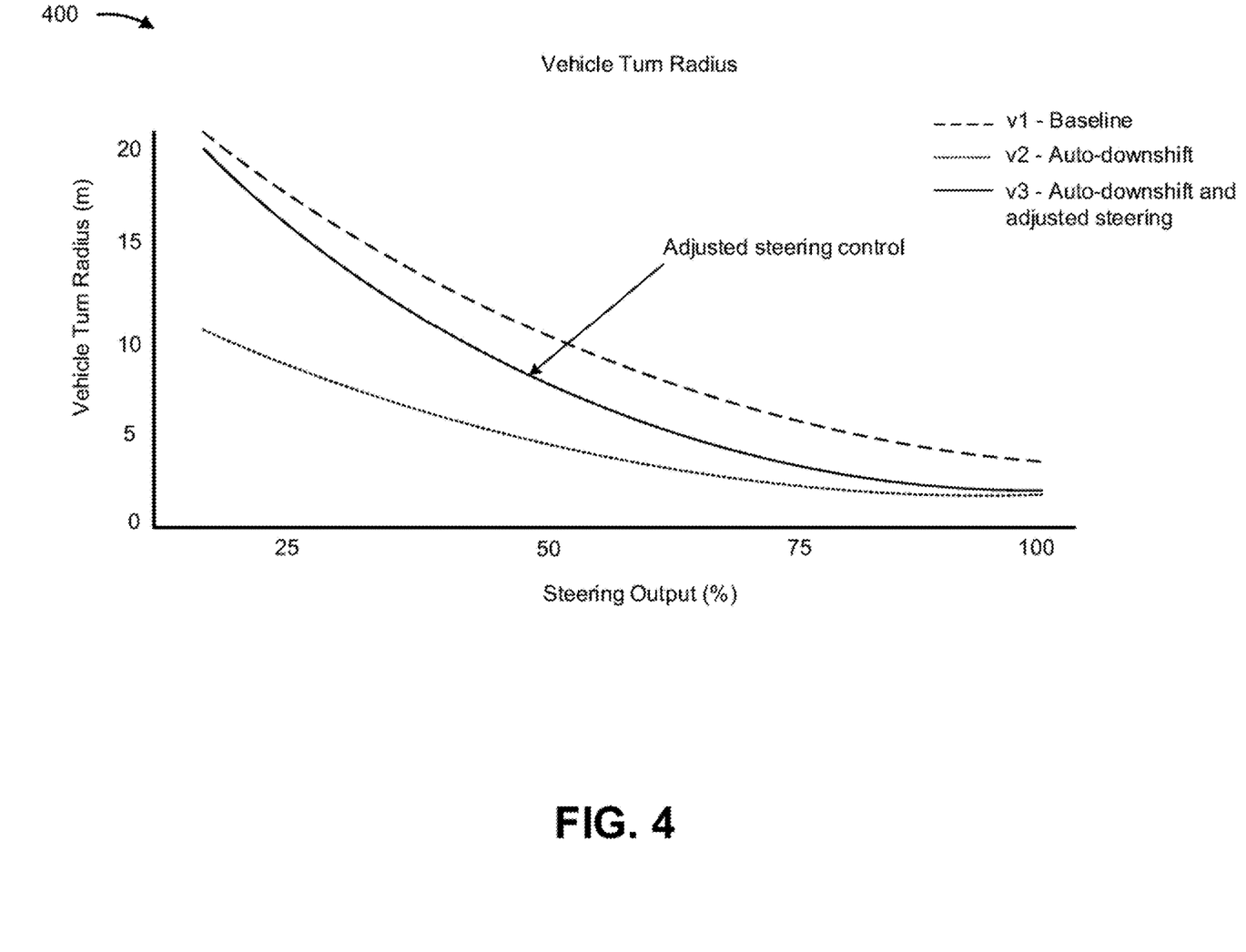
FIG. 4 is a diagram of an example implementation relating to the example process shown in FIG. 3.

FIG. 4 is a diagram of an example implementation relating to example process 300 shown in FIG. 3. FIG. 4 shows an example of transmission control or steering control based on one or more operating inputs associated with a vehicle. FIG. 4 shows a graph 400 of an example implementation of how vehicle controller 250 can adjust steering output from hydraulic motor 230. Graph 400 shows three sets of measurements v1, v2, v3 that illustrate how steering output (which may be based on a steering input received from a steering input mechanism) affects a turning radius under three corresponding implementations. The first set of measurements v1 is a baseline that corresponds to an unassisted vehicle that does not downshift based on operating measurements or adjust steering, as described herein. The second set of measurements v2 corresponds to a vehicle that automatically downshifts based on detecting a turning maneuver as described herein. The third set of measurements v3 corresponds to a vehicle that automatically downshifts and adjusts steering to account for the downs shifts as described herein. As shown by all sets of measurements v1, v2, v3, the lower the amount of steering output (in one direction or the other), the greater the turning radius, and the higher the amount of steering output, the lower the turning radius.

As shown by the first set of measurements v1, the turning radius of the vehicle relative to the other sets of measurements v2, v3 is higher. Accordingly, without downshifting, the vehicle may not be able to follow a desired path and/or perform particular turning maneuvers. As shown by the second set of measurements v2, when the vehicle (e.g., via vehicle controller 250) automatically downshifts, the turning radii of the vehicle is smaller relative to the baseline measurements. Accordingly, with an automatic downshift, the vehicle can make sharper turns without an operator having to manually downshift the transmission of the vehicle using a manual downshift input or control (e.g., a button, a lever, and/or the like).

As shown by the third set of measurements v3 in the graph 400, the vehicle (e.g., via vehicle controller 250) can adjust the steering to account for the speed change associated with automatically downshifting the transmission of the vehicle. As shown, by the difference between the example second set of measurements v2 and the example third set of measurements v3, the vehicle may make relatively large steering adjustments (e.g., to achieve a steering radius almost to the point of the baseline) when the steering output is 50% or less. However, as the steering output is increased above 50% (meaning the operator desires to make a tighter turn), the steering adjustment gradually lessens to the automatic downshift only measurements at 100% as the indicated tighter turns may not require any steering adjustment by the vehicle. Accordingly, vehicle controller 250 may variably adjust the steering output by adjusting the steering input more when the steering input is relatively less and adjusting the steering output less when the steering input is relatively more.

As indicated above, FIG. 4 is provided merely as an example. Other examples are possible and may differ from what was described with regard to FIG. 4.

INDUSTRIAL APPLICABILITY

The disclosed vehicle controller 250 may be used with any vehicle (e.g., vehicle 110) that uses a differential steering system (e.g., that includes differential gear box 220, hydraulic pump 225, hydraulic motor 230, steering input mechanism 235, and/or the like), such as a dozer, an excavator, a skid steer, and/or the like. The disclosed vehicle controller 250 may provide automatic shifting between mechanical gears of a powershift transmission (e.g., transmission 215) and/or control of the differential steering system to control vehicle 110 to follow a desired path determined from one or more operating inputs of vehicle 110. For example, as described herein, based on one or more operating inputs (e.g., a steering input, an engine deceleration input, a navigation input, and/or the like), vehicle controller 250 of vehicle 110 may control transmission 215 and/or a flow from hydraulic pump 225 to hydraulic motor 230 to cause vehicle 110 to follow a desired path.

According to some implementations, vehicle controller 250 monitors steering input mechanism 235 (e.g., that is controlled by an operator) and/or engine decelerator 245 (e.g., that is controlled by the operator) to determine the desired path of vehicle 110. For example, vehicle controller 250 may detect a turning maneuver (e.g., with a decreased turn radius) based on an amount that a steering lever (associated with steering input mechanism 235) is adjusted and/or an amount a decelerator input (associated with engine decelerator 245 is activated (e.g., compressed, pushed, and/ or the like). Based on detecting the turning maneuver, vehicle controller 250 may shift gears of the powershift transmission (e.g., downshift into the turning maneuver and/or upshift out of the turning maneuver) and adjust a hydraulic flow from hydraulic pump 225 to hydraulic motor 230 to account for the change in the ratio between engine speed and transmission output speed (caused by the gear shift) to ensure that vehicle 110 follows the desired path.

Accordingly, vehicle 110 (e.g., using a vehicle controller) may automatically control a transmission setting of transmission 215 and/or hydraulic flow to hydraulic motor 230 to cause vehicle 110 to follow a desired path determined from one or more operating inputs. As such, as shown in example implementation 100, maneuverability and ease of operation of vehicle 110 can be enhanced to conserve resources (e.g., fuel and/or processing resources) to navigate vehicle 110 along a desired path. For example, some implementations described herein can enhance operator experience by increasing ease of maneuverability and ease of operation of vehicle 110 over prior techniques. Furthermore, resources associated with vehicle 110 can be conserved by avoiding over steering and/or under steering vehicle 110 relative to the desired path. For example, vehicle controller 250 can keep vehicle on the desired path to avoid wasting resources (e.g., fuel resources, processing resources, power resources, and/or the like) associated with vehicle 110 veering off the desired path and being returned to the desired path. Some implementations may conserve hardware resources associated with replacing and/or repairing hardware components and/or replacing or repairing vehicles that are damaged attempting to perform turning maneuvers at relatively high speeds without being downshifted and/or controlled with steering adjustments, as described herein.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A vehicle controller, comprising:
one or more processors to:
monitor a first operating input of a vehicle corresponding to a steering input;
monitor a second operating input corresponding to an engine deceleration input;
determine a turning maneuver is to be performed by the vehicle with a decreased turn radius based on the steering input and the engine deceleration input;
determine that a transmission of the vehicle is to be downshifted to a low gear to enable the vehicle to perform the turning maneuver; and
downshift the transmission to the low gear.

2. The vehicle controller of claim 1, wherein the one or more processors, when determining the turning maneuver is to be performed, are to:
determine that a value associated with the steering input or engine deceleration input satisfies a threshold; and
determine the turning maneuver is to be performed based on the value satisfying the thresh old.

3. The vehicle controller of claim 1, wherein the one or more processors are further to adjust a steering output, associated with a hydraulic motor of the vehicle, based on downshifting the transmission, to cause the vehicle to perform the turning maneuver along a desired path.

4. The vehicle controller of claim 3, wherein the one or more processors, when adjusting the steering output, are to:
decrease a hydraulic flow within a hydraulic circuit associated with the hydraulic motor.

5. The vehicle controller of claim 1, wherein the one or more processors, when downshifting the transmission, are to:
determine that an automatic shift input is enabled; and
downshift the transmission based on the automatic shift input being enabled.

6. The vehicle controller of claim 1, wherein the transmission comprises a powershift transmission with at least two discrete gear ratios.

7. A system of a vehicle comprising:
a steering input mechanism;
a powershift transmission with at least two discrete gear ratios;
a hydraulic motor; and
a vehicle controller to:
receive an operating input of the vehicle from the steering input mechanism;
determine a turning maneuver is to be performed by the vehicle with decreased turn radius based on the operating input;
determine that the powershift transmission of the vehicle is to be downshifted to a lower gear to enable the vehicle to perform the turning maneuver;
automatically downshift the transmission to the lower gear; and
adjust a steering output, associated with the hydraulic motor of the vehicle, based on downshifting the powershift transmission to the lower gear and the operating input, to cause the vehicle to perform the turning maneuver along a desired path.

8. The system of claim 7, Wherein the vehicle controller, when determining the turning maneuver is to be performed, is to:

determine that the operating input satisfies a threshold; and determine the turning maneuver is to be performed based on the operating input satisfying the threshold.

9. The system of claim 7, wherein the hydraulic motor is controlled by a hydraulic flow from a hydraulic pump of the system.

10. The system of claim 7, wherein the vehicle controller, when adjusting the steering output, is to cause a decrease of hydraulic flow to the hydraulic motor.

11. The system of claim 7, wherein the operating input comprises a navigation input, and the vehicle controller, when determining the turning maneuver is to be performed, is to:

determine the turning maneuver based on a turn in a path of interest included in the navigation input.

12. The system of claim 7, wherein the vehicle controller, when determining the powershift transmission is to be downshifted, is to:

adjust a downshift threshold based on the operating input; and determine that the powershift transmission is to be downshifted to the lower gear when the downshift threshold is satisfied.

13. The system of claim 7, wherein the system further comprises a differential gear box that receives mechanical power from the powershift transmission and steers the vehicle by applying power to drives of the vehicle based on the steering output.

14. A method, comprising:

monitoring, by a vehicle controller, a steering input of a vehicle;

monitoring, by the vehicle controller, an engine deceleration input of the vehicle;

determining, by the vehicle controller, a turning maneuver with a decreased turn radius is to be performed by the vehicle based on the steering input and the engine deceleration input;

determining, by the vehicle controller, that a transmission of the vehicle is to be downshifted to a lower gear to enable the vehicle to perform the turning maneuver;

downshifting, by the vehicle controller, the transmission to the lower gear; and adjusting, by the vehicle controller, a steering output, associated with a hydraulic motor of the vehicle, based on downshifting the transmission, to cause the vehicle to perform the turning maneuver along a desired path.

15. The method of claim 14, wherein the transmission is a powershift transmission with at least two discrete gear ratios.

16. The method of claim 14, wherein downshifting the transmission to the low gear comprises:

automatically downshifting the transmission to the low gear without an operator using a manual downshift input.

* * * * *